US00RE40433E

(19) United States
(12) Reissued Patent
Schmon

(10) Patent Number: US RE40,433 E
(45) Date of Reissued Patent: Jul. 15, 2008

(54) NOZZLE ARRANGEMENT FOR A PAINT SPRAY GUN

(75) Inventor: Ewald Schmon, Grafenberg (DE)

(73) Assignee: Sata GmbH & Co. KG, Kornwestheim (DE)

(21) Appl. No.: 11/022,425

(22) Filed: Dec. 21, 2004

Related U.S. Patent Documents

Reissue of:

(64) Patent No.: 5,613,637
Issued: Mar. 25, 1997
Appl. No.: 08/357,014
Filed: Dec. 16, 1994

(30) Foreign Application Priority Data

Oct. 5, 1994 (DE) ..... G 94 16 015

(51) Int. Cl.
*B05B 7/04* (2006.01)
*B05B 1/06* (2006.01)

(52) U.S. Cl. ..... 239/296; 239/518; 239/526; 239/600; 239/DIG. 14

(58) Field of Classification Search ..... 239/290, 239/296, 300, 600, DIG. 14, 525, 526, 461, 239/518

See application file for complete search history.

(56) References Cited

U.S. PATENT DOCUMENTS

| | | | | |
|---|---|---|---|---|
| 2,269,057 A | | 1/1942 | Jenkins | |
| 4,545,536 A | | 10/1985 | Avidon | |
| 4,917,300 A | | 4/1990 | Gloviak et al. | |
| 5,344,078 A | * | 9/1994 | Fritz et al. | 239/296 |
| 5,435,491 A | * | 7/1995 | Sakuma | 239/DIG. 14 X |

FOREIGN PATENT DOCUMENTS

FR 2 444 501 7/1980

* cited by examiner

*Primary Examiner*—Steven J. Ganey
(74) *Attorney, Agent, or Firm*—Martin Fleit; Paul D. Bianco; Fleit Gibbons Gutman Bongini & Bianco P.L.

(57) ABSTRACT

A nozzle structure for a paint spray gun, is comprised of a central outlet for paint, an annular slot surrounding the central outlet, the annular slot being connected inside the nozzle structure via an annular duct to a number of virtually axially parallel bores, the bores being situated on at least one circle about a central axis of the nozzle structure, apparatus for providing[.] compressed air via the bores for delivery to the annular duct, and an air [reversing] *deflection* disk located inside the annular duct and opposite the bores.

26 Claims, 2 Drawing Sheets

NOZZLE ARRANGEMENT FOR A PAINT SPRAY GUN

Matter enclosed in heavy brackets [ ] appears in the original patent but forms no part of this reissue specification; matter printed in italics indicates the additions made by reissue.

FIELD OF THE INVENTION

The invention relates to a nozzle arrangement for a paint spray gun, as well as the paint spray gun.

BACKGROUND TO THE INVENTION

A nozzle arrangement for a paint spray gun is described in German Utility Model G 90 01 265.8. The nozzle arrangement described in that document has a central outlet for the paint which can be closed with an axially extending pin. The paint flows pressureless from a fluid container to this sealable outlet. The outlet is surrounded by an annular slot out of which a circular air jet of high velocity flows, which thereby sucks paint out of the outlet, atomizes it and carries it along, as a result of which a circular jet consisting of paint particles is formed.

Laterally of the jet direction, the nozzle arrangement has two protruding horns, horn air jets of which are directed diagonally and in the same direction to the direction of flow of and into the circular jet, which deformed it. To control the horn air, the nozzle arrangement has, on both sides of the outlet in the direction of the horns, two or more control bores through which air passes and impacts the horn air jets and thus controls them.

Both the annular slot and the control bores are supplied with air from the same air chamber, namely an annular duct inside the nozzle arrangement. This annular duct is supplied with compressed air from supply bores which are located in a paint nozzle and the axes of which are arranged parallel and equidistant on a circle around the axis of the nozzle arrangement.

A disadvantage of the arrangement described is that the air does not flow uniformly into the annular slot via the supply bores arranged about the periphery inside the nozzle arrangement, as a result of which the air/paint mixture is not distributed as uniformly as possible in the circular jet. If the air pressure were measured along the periphery of the annular slot, then an almost sinusoidal modulation would result, whereby peaks occur in the angular area of the annular slot, in which the bores are also located, and minimums in between.

In addition, this arrangement has the disadvantage that the air from the supply bores reaches directly into the control bores for the horn air, depending on the angular position of the paint nozzle having the bores relative to the housing or air cap of the paint spray gun, when the supply bores are about colinear with these control bores and, as a result, the horn air is affected too greatly in an undesirable manner, which in turn changes the jet pattern in an undesirable manner. The spray result thus depends on the relative position of the air cap having the horns and control bores relative to the paint nozzle which has the supply bores. However, the position of the paint nozzle screwed into the housing of the paint spray gun is determined by the starting cut of its thread and thus a great extent accidental, so that some of the guns produced exhibit undesirable paint coat properties.

SUMMARY OF THE INVENTION

Thus, it is an object of the invention to provide a nozzle arrangement such that the annular air jet flows out as homogeneously as possible and accidental losses of quality are avoided during production.

In accordance with an embodiment of the invention a nozzle structure for a paint spray gun is comprised of a central outlet for paint, an annular slot surrounding the central outlet, the annular slot being connected inside the nozzle structure via an annular duct to a number of virtually axially parallel bores, the bores being situated on at least one circle about a central axis of the nozzle structure, apparatus for providing compressed air via the bores for delivery to the annular duct, and an air [reversing] *deflection* disk located inside the annular duct and opposite the bores.

BRIEF INTRODUCTION TO THE DRAWINGS

An embodiment of the invention shall be described in greater detail with reference to the accompanying drawings, in which.

DETAILED DESCRIPTION OF THE INVENTION

Figure 1:
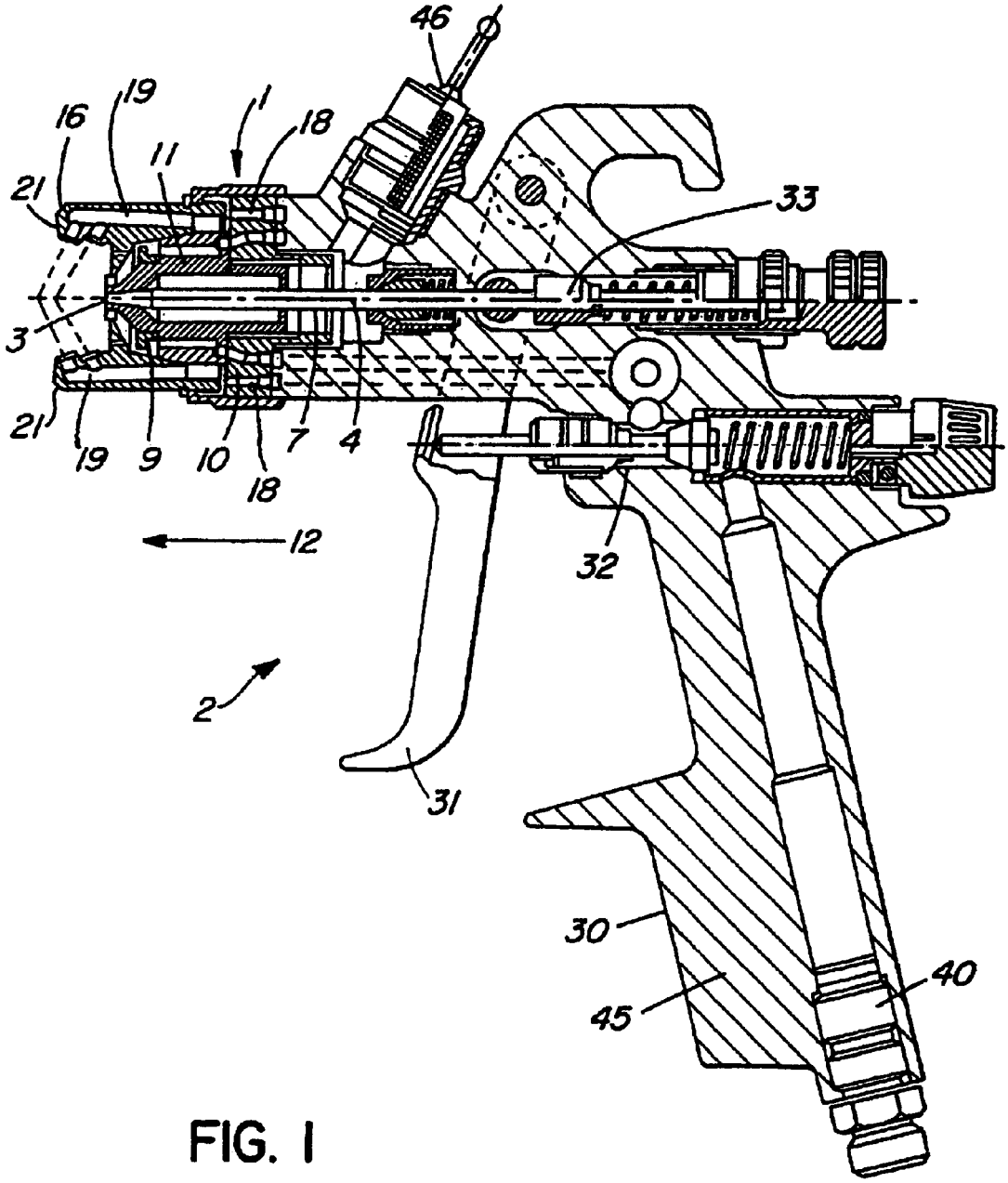
FIG. 1 is a cross-section through a paint spray gun.

The paint spray gun shown in the Figure is comprised essentially of a housing 30 which includes an upper part with a suspension hook and a handle 45. A compressed-air supply conduit is attached to the underside of the handle 45, an air choke 40 can be built in to decrease the pressure when the air enters, primarily in low-pressure guns; a fluid container for the paint is mounted on the top at a connection 46. The compressed air (via a valve arrangement 32) and the outlet 3 (via a pin control device 33) are simultaneously released for the paint by means of an operating lever 31. The paint flows from the fluid container (not shown), without pressure support, to the outlet 3 and passes out there when the pin 7 is pulled back. Compressed air flows simultaneously via a conduit system to the annular slot 5 which surrounds the outlet 3 and produces a vacuum directly at the outlet 3. This vacuum sucks paint out of the outlet 3, which is then atomized and carried along due to the quick-flowing air while forming a circular jet. The circular jet is pressed together by two horn air jets which pass out of the horns 21 forming a part of the nozzle arrangement 1, in such a way that the circular jet is deformed into a flat jet. The air flow from the outlet holes 20 of the horns 21 is, in turn, affected by control bores 22 which are not provided with reference numbers in FIG. 1.

To describe the nozzle arrangement 1 in greater detail, reference is made to FIG. 2 below, in which axis 4 refers to the central axis of the nozzle arrangement, in which the pin 7 is also located and the direction of the flow of the main jet direction of the air/paint mixture passing out of the nozzle, as shown by arrow 12.

Figure 2:
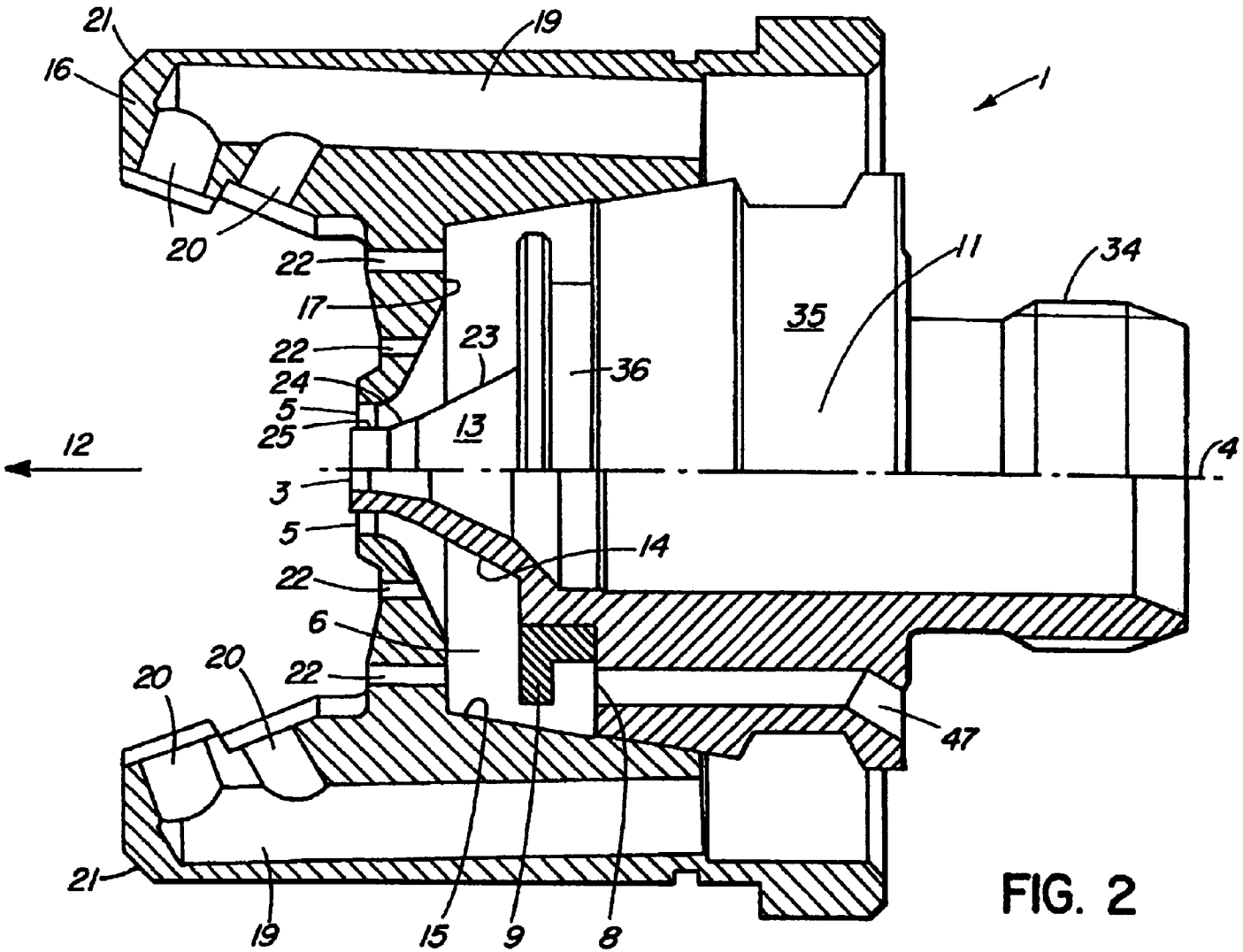
FIG. 2 is the nozzle arrangement used in the paint spray gun of FIG. 1, in section and partial cross-section.

The nozzle arrangement 1 shown in FIG. 2 is comprised of paint nozzle 11, which is screwed into a nozzle insert 10 (see FIG. 1) of the paint spray gun 2 via an external thread 34 and which contains axially parallel air bores 18. The paint nozzle 11 is surrounded by an air cap 16 which is screwed together with an external thread of the nozzle insert 10 with aid of a cap nut (not shown).

A middle section 35 of a larger diameter adjoins the external thread 34 of the paint nozzle 11 for screwing into the nozzle insert 10, the middle section being hollow on the inside to admit the pin 7 and having an annular recess 47 on its rear facing the external thread 34. Six axially parallel, identical bores 8, arranged on a circle about the axis 4, extend from this recess at a distance of 60° through the middle section 35 of the paint nozzle 11. Finally, the paint nozzle 11 also has a front area 13 which extends from the outlet of the bores 8 to the front end of the paint nozzle 11. This front area is comprised of a cylindrical part 36 whose diameter is small enough to keep the front end of the bores 8 clear. A further, disk-shaped cylindrical area of a larger diameter, which is relatively thin and is called an air [reversing] *deflection* disk 9 below, adjoins this cylindrical area 36. The diameter of the air [reversing] *deflection* disk 9 is measured in such a way that, seen from the front, the bores 8 are completely covered. The furthermost front area of the paint nozzle 11 finally divides into a conical taper 23 at a first angle of about 30° to the axis 4, a conical taper 24 adjacent thereto at a second, smaller angle and a cylindrical end area 25 adjacent thereto.

The air cap 16 surrounding the paint nozzle 11 when assembled is essentially symmetric to axis 4 on the inside. However, it has two horns 21 which are diametrically opposite one another and protrude beyond the annular slot 5 and outlet 3 in the direction of flow 12. Two supply bores 19 extend from the rear of the air cap 16 to outlet holes 20 in the horns 21, whereby each horn 21 has two holes 20. Holes 20 are directed in such a way that they point to the axis 4 in the direction of flow 12 toward the annular slot 5, that is, they can affect the air which has already passed out of the annular slot 5.

The air cap 16 has a middle region which ends at the annular slot 5. This middle region is passed through by four control bores 22 which are arranged on a line between the two horns 21, that is, their air flow can again affect the horn air coming out of the outlet holes 20 of horns 21. In the region of the inside control bores 22, the inside wall of air cap 16 (which will be described later as outside wall 15 of the annular duct 6) curves continuously until it is parallel to axis 4. Thus, there is no sharp transition here.

The assembled arrangement is comprised of paint nozzle 11 and air cap 16, as shown in FIG. 2, and forms an annular duct 6 between the outside of the front area 13 (with 36) of the paint nozzle 11 and the inside of the air cap 16. This annular duct 6 begins at the end of bores 8 and extends past the air reversing disk 9 to the annular slot 5. To the outside, it is only opened by the control bores 22. The outside wall 15 of the annular duct 6 tapers from the bores 8 to the annular slot 5, at first continuously beyond the area of the air reversing disk 9. A discontinuous jump then takes place on a plane annular surface 17, which is directed essentially at right angles to the axis 4. The outside wall 15 then tapers continuously again and changes in the area of the middle, that is of the annular slot 5, continuously into a run parallel to the axis 4, without a sharp bend taking place.

The inside wall 14, formed by the paint nozzle 11, with which the air [reversing] *deflection* disk 9 can be made in one piece, also tapers adjacent to the air [reversing] *deflection* disk 9, namely, as described above, at two different angles (areas 23 and 24) and then runs cylindrically (area 25). The innermost area of the air cap 16 thus forms the annular slot 5 with the cylindrical area 25 at the front end of the paint nozzle 11.

The nozzle arrangement of the invention functions as follows after it has been attached to a paint spray gun.

By actuating the operating lever 31, the pin 7 is pulled back opposite to the direction of flow 12 and, at the same time, the nozzle insert 10 is acted upon by two compressed air flows, which can be controlled separately on the paint spray gun. The outer compressed air flow reaches the outlet holes 20 via bores 18 in the nozzle insert 10 and the two supply bores 19 in the horns 21 of the air cap 16. The outlet holes are directed downward or upward to the extension of the axis 4 in direction of flow 12. The inner compressed air flow reaches the six bores 8 inside the paint nozzle 11 in the annular duct 6. This compressed air flow hits the air [reversing] *deflection* plate 9, which completely covers bores 8, at a high speed. Thus, a very turbulent flow, which also has considerable tangential components and distributes the compressed air in peripheral direction, results between the outlet of bores 8 and the air [reversing] *deflection* plate 9. The compressed air then flows through the narrow area of the annular duct 6 past the air [reversing] *deflection* disk 9 and hits the plane annular surface 17. A relatively strong turbulence results, in turn, due to the sudden change in direction and thus a further homogenization of the pressure ratios.

Finally, the compressed air passes through the rest of the annular duct 6 which continues to taper more and more and then has no more corners or edges acting as a flow [reverser] *deflector*, but is kept as smooth and continuous as possible in order to attain a certain laminating of the flow. The air flow, almost completely homogenized in this way, passes out of the annular slot 5, sucks the paint out of the outlet 3 in a known manner, atomizes it and carries it along while forming a circular jet.

The flow velocity is increased by the air duct 6 tapering in the direction of the annular slot 5, that is, an optimum conversion of the fall in pressure takes place from the air duct 6 to the ambient pressure in velocity.

The circular jet thus formed is affected by the horn air from the outlet holes 20, also in a known manner. The influence of the horn air takes place again in a known manner through the control bores 22, however, significantly more homogeneously, more reliably and more uniformly than with the known nozzle arrangements. This is due to the fact that a straight alignment of the control bores 22 with bores 8 is no longer possible, because the air [reversing] *deflection* plate 9 is located between them. Thus, in the nozzle arrangement of the invention, it is inconsequential what the relative position of paint nozzle 11 and air cap 16 is, since the air passing out of bores 8 is always prevented, with certainty, from flowing directly against the control bores 22 by means of the air [reversing] *deflection* disk 9. Due to the fact that uniform spray jet geometries result, a spray gun or nozzle arrangement of this type can also be made more quickly and with less expense.

The nozzle arrangement described can be used both in high-pressure and low-pressure paint spray guns. However, it does have special advantages in modern low-pressure guns since these react more sensitively to variations in pressure.

I claim:

1. A nozzle structure for a paint spray gun, comprising a central outlet for paint, an annular slot surrounding the central outlet, the annular slot being connected inside the nozzle structure via an annular duct *having a downstream end connected to the annular slot and an upstream end connected* to a number of virtually axially parallel bores, the bores being situated on at least one circle about a central axis of the nozzle structure, means for providing compressed air via the bores for delivery to the *upstream end of the* annular duct, and an air [reversing] *deflection* disk located inside the annular duct and opposite the bores *for producing at the upstream end of the annular duct a first area of turbulence in the flow of air from the bores to the annular slot.*

2. A nozzle structure [as defined in claim 1] *for a paint spray gun, comprising a central outlet for paint, an annular slot surrounding the central outlet, the annular slot being connected inside the nozzle structure via an annular duct to*

*a number of virtually axially parallel bores, the bores being situated on at least one circle about a central axis of the nozzle structure, means for providing compressed air via the bores for delivery to the annular duct, and an air deflection disk located inside the annular duct and opposite the bores*, wherein said nozzle structure is comprised of a paint nozzle containing the bores, the air [reversing] *deflection* disk is round and is in one piece with the paint nozzle that contains the bores, the nozzle structure containing a round nozzle insert for retaining the nozzle arrangement by means of threads, a front region of said paint nozzle forming, in a direction of paint flow, an inside wall of the annular duct, an outside wall of the annular duct being formed by an air cap which is attachable to the nozzle insert.

3. A nozzle structure as defined in claim 2, in which an outside wall of the annular duct tapers continuously from the bores to the annular slot and curves continuously in the region of the annular slot until said wall is parallel with the central axis.

4. A nozzle structure as defined in claim 3, wherein the continuous tapering of the outside wall in a direction toward the air [reversing] *deflection* disk is discontinuously interrupted by a plane annular surface oriented at almost right angles to the central axis.

5. A nozzle structure as defined in claim 2, wherein the nozzle insert has axially parallel horn air bores at the periphery of the nozzle insert, the air cap containing two diametrically opposite, axially parallel supply bores, two diametrically opposite horns containing outlet holes, the air bores being connected to the supply bores, the supply bores being connected to the outlet holes, the outlet holes being directed to the central axis in a direction of flow toward the annular slot.

6. A nozzle structure as defined in claim 5, in which the air cap has at least one essentially axially parallel control bore between the central axis and each of said horns.

7. A nozzle structure as defined in claim 6, in which the air cap has two essentially axially parallel control bores between the central axis and each of said horns.

8. A nozzle structure as defined in claim 2, wherein the inside wall of the annular duct tapers conically in a direction of the air [reversing] *deflection* disk, starting at a first angle, following at a second, smaller angle and finally being cylindrical to form a inside wall of the annular slot.

9. A nozzle structure as defined in claim 5, and further including a paint spray gun on which the nozzle structure is mounted.

10. A nozzle structure [as defined in claim 1] *for a paint spray gun, comprising a central outlet for paint, an annular slot surrounding the central outlet, the annular slot being connected inside the nozzle structure via an annular duct to a number of virtually axially parallel bores, the bores being situated on at least one circle about a central axis of the nozzle structure, means for providing compressed air via the bores for delivery to the annular duct, and an air deflection disk located inside the annular duct and opposite the bores*, in which an outside wall of the annular duct tapers continuously from the bores to the annular slot and curves continuously in the region of the annular slot until said wall is parallel with the central axis.

11. A nozzle structure as defined in claim 10, wherein the continuous tapering of the outside wall in a direction toward the air [reversing] *deflection* disk is discontinuously interrupted by a plane annular surface oriented at almost right angles to the central axis.

12. A nozzle structure as defined in claim 10, further including a nozzle insert having axially parallel horn air bores at the periphery of the nozzle insert, an air cap forming an outside wall of the annular duct containing two diametrically opposite, axially parallel supply bores, two diametrically opposite horns containing outlet holes, the air bores being connected to the supply bores, the supply bores being connected to the outlet holes, the outlet holes being directed to the central axis in a direction of flow toward the number slot.

13. A nozzle structure as defined in claim 10, wherein the inside wall of the annular duct tapers conically in a direction of the air [reversing] *deflection* disk, starting at a first angle, following at a second, smaller angle and finally being cylindrical to form an inside wall of the annular slot.

14. A nozzle structure [as defined in claim 1] *for a paint spray gun, comprising a central outlet for paint, an annular slot surrounding the central outlet, the annular slot being connected inside the nozzle structure via an annular duct to a number of virtually axially parallel bores, the bores being situated on at least one circle about a central axis of the nozzle structure, means for providing compressed air via the bores for delivery to the annular duct, and an air deflection disk located inside the annular duct and opposite the bores*, wherein the inside wall of the annular duct tapers conically in a direction of the air reversing disk, starting at a first angle, following at a second, smaller angle and finally being cylindrical to form an inside wall of the annular slot.

15. A nozzle structure [as defined in claim 1] *for a paint spray gun, comprising a central outlet for paint, an annular slot surrounding the central outlet, the annular slot being connected inside the nozzle structure via an annular duct to a number of virtually axially parallel bores, the bores being situated on at least one circle about a central axis of the nozzle structure, means for providing compressed air via the bores for delivery to the annular duct, and an air deflection disk located inside the annular duct and opposite the bores*, wherein the air reversing disk is made as a separate component which is mounted onto a paint nozzle that contains the bores and is retained by the nozzle structure.

16. A nozzle structure as defined in claim 1, wherein the bores are arranged on one or more circles about the central axis.

17. A nozzle structure as defined in claim 1, and further including a paint spray gun on which the nozzle structure is mounted.

*18. A nozzle structure as defined in claim 1, wherein the air deflection disk includes an edge for producing* [a] *the first area of turbulence in the flow of air from the bores to the annular slot.*

*19. A nozzle structure as defined in claim 18, wherein the annular duct includes an annular surface between the air deflection disk and the annular slot for producing a second area of turbulence in the flow of air from the bores to the annular slot.*

*20. A nozzle structure as defined in claim 18, wherein the annular duct includes an outside tapered wall, and the edge of the air deflection disk is spaced from the outside wall to form an opening allowing air to flow past the air deflection disk toward the annular slot.*

*21. A nozzle structure as defined in claim 1, wherein the air deflection disk includes an edge interrupting the flow of air exiting from the bores and distributing the air peripherally around the annular duct.*

*22. A nozzle structure for a paint spray gun according to claim 1, wherein the annular duct includes an annular surface between the air deflection disk and the annular slot for producing a second area of turbulence in the flow of air from the bores to the annular slot.*

*23. A nozzle structure for a paint spray gun, comprising a central outlet for paint, an annular slot surrounding the central outlet, the annular being connected inside the nozzle structure via an annular duct to a number of virtually axially parallel bores, the bores being situated on at least one circle about a central axis of the nozzle structure, means for providing compressed air via the bores for delivery to the annular duct, and an air deflection disk located inside the annular duct and opposite the bores, wherein the annular duct includes an inside wall and an outside tapered wall extending from the air deflection disk to the annular slot.*

*24. A nozzle structure for a paint spray gun, comprising a central outlet for paint, an annular slot surrounding the central outlet, the annular slot being connected inside the nozzle structure via an annular duct to a number of virtually axially parallel bores, the bores being situated on at least one circle about a central axis of the nozzle structure, means for providing compressed air via the bores for delivery to the annular duct, and an air deflection disk located inside the annular duct and opposite the bores, further including at a pair of air jet horns, and least a pair of axial air control bores respectively on opposite sides of the annular slot and connected with the annular duct for controlling the air jet horns, and wherein the air deflection disk is disposed between the bores and the control bores to prevent the direct flow of air from the bores to the control bores.*

*25. A nozzle structure as defined in claim 24, wherein the air deflection disk includes an edge disposed in the path of the air flow from the bores for producing air turbulence with tangential components that peripherally distribute the air around the annular duct.*

*26. A nozzle structure as defined in claim 24, wherein the air deflection disk includes an edge for homogenizing the pressure around the periphery of the annular duct.*

* * * * *